United States Patent
Vtulkin

(10) Patent No.: US 10,512,981 B2
(45) Date of Patent: Dec. 24, 2019

(54) DEVICE AND METHOD FOR RECOVERING TIN-LEAD SOLDER FROM SCRAP

(71) Applicant: Denis Aleksandrovich Vtulkin, Otradny (RU)

(72) Inventor: Denis Aleksandrovich Vtulkin, Otradny (RU)

( * ) Notice: Subject to any disclaimer, the term of this patent is extended or adjusted under 35 U.S.C. 154(b) by 57 days.

(21) Appl. No.: 15/519,545

(22) PCT Filed: Nov. 11, 2015

(86) PCT No.: PCT/RU2015/000765
§ 371 (c)(1),
(2) Date: Apr. 16, 2017

(87) PCT Pub. No.: WO2016/076764
PCT Pub. Date: May 19, 2016

(65) Prior Publication Data
US 2017/0239742 A1    Aug. 24, 2017

(30) Foreign Application Priority Data
Nov. 12, 2014    (RU) ................................ 2014145417

(51) Int. Cl.
*B23K 1/018* (2006.01)
*C22B 7/00* (2006.01)
(Continued)

(52) U.S. Cl.
CPC ............ *B23K 1/018* (2013.01); *B23K 1/0016* (2013.01); *C22B 7/001* (2013.01); *C22B 7/004* (2013.01);
(Continued)

(58) Field of Classification Search
None
See application file for complete search history.

(56) References Cited

U.S. PATENT DOCUMENTS 5,743,936 A * 4/1998 Yokoyama ............ C22B 11/046
29/426.4
6,336,601 B1 * 1/2002 Ueno ........................ B09B 3/00
241/23
(Continued)

FOREIGN PATENT DOCUMENTS

JP    83225863 A    9/1996
JP    3356571 B2    4/2002
(Continued)

OTHER PUBLICATIONS

Search report in PCT/RU2015/000765, dated Feb. 4, 2016.

*Primary Examiner* — Devang R Patel
(74) *Attorney, Agent, or Firm* — Bardmesser Law Group

(57) ABSTRACT

The invention relates to recovery of tin-lead solder from electronic printed circuit board scrap. The scrap is placed in a liquid-permeable and/or gas-permeable container, which is placed in a liquid or gaseous heat-transfer medium heated to or above the melting temperature of the tin-lead solder. After the tin-lead solder is melted, the heat-transfer medium is removed from the container, then, by means of rotation of the container, the melted tin-lead solder and the remains of the heat-transfer medium are removed from the container. The device comprises a hollow container, which is mounted so as to be capable of rotation and is designed in the form of a body of revolution, and is liquid-permeable and/or gas-permeable in a radial direction from the axis of rotation. The container can be designed in the form of a drum, which can be vertically displaced and has perforated side walls.

5 Claims, 3 Drawing Sheets

(51) Int. Cl.
  *C22B 25/06* (2006.01)
  *B23K 1/00* (2006.01)
  *B23K 101/42* (2006.01)
(52) U.S. Cl.
  CPC .............. *C22B 7/005* (2013.01); *C22B 7/006* (2013.01); *C22B 25/06* (2013.01); *B23K 2101/42* (2018.08); *Y02P 10/228* (2015.11)

(56) References Cited

U.S. PATENT DOCUMENTS

| | | | | |
|---|---|---|---|---|
| 6,467,671 | B1* | 10/2002 | Unagami | B23K 1/018 |
| | | | | 228/20.1 |
| 6,705,509 | B2* | 3/2004 | Tada | B23K 1/018 |
| | | | | 228/119 |
| 2014/0217157 | A1* | 8/2014 | Brosseau | H05K 13/0486 |
| | | | | 228/264 |
| 2015/0068363 | A1* | 3/2015 | Almeida | C22B 7/003 |
| | | | | 75/401 |
| 2017/0223882 | A1* | 8/2017 | Brosseau | B23K 1/018 |

FOREIGN PATENT DOCUMENTS

| | | | | |
|---|---|---|---|---|
| RU | 145776 U1 * | 9/2014 | ............... | C22B 7/00 |
| RU | 145776 U1 | 9/2014 | | |
| SU | 301236 A1 | 7/1971 | | |

\* cited by examiner

DEVICE AND METHOD FOR RECOVERING TIN-LEAD SOLDER FROM SCRAP

CROSS REFERENCE TO RELATED APPLICATIONS

This application is a US National Phase of PCT/RU2015/000765, filed on Nov. 11, 2015, which claims priority to RU Patent Application No. 2014145417, filed on Nov. 122, 2014, which are both incorporated herein by reference in their entirety.

BACKGROUND OF THE INVENTION

Field of the Invention

This present invention relates to the processing of metal waste, and specifically to the means of recovery of tin-lead solder from electronic printed circuit board scrap.

Description of the Related Art

A method for recovering articles with soldered parts and device for carrying out the same is known (see Russian patent 2089632 published on Sep. 10, 1997), wherein the method consists in placing the articles, applying force to them, heating them, detaching parts and solder from the articles and separating them, wherein the articles are placed around the heating center, the force applied is centrifugal force, the articles are heated up to 170-300° C., and parts and solder are detached at the centrifugation factor of 150-800 g, wherein centrifugal force is applied after the articles have been heated, while the device comprises a heat-insulated body, a bracket heater, a perforated partition, a mounting appliance with holes, which has a side wall, a bottom, an article lock and a bracket, and bins for parts and solder, characterized in that the holes are made in the side wall of the mounting appliance, the parts of the side wall, which are adjacent by perimeter, are located at equal distances from the central vertical axis of the appliance, the bracket of the mounting appliance is designed in the form of a shaft and is mounted vertically and coaxially to the appliance itself, the locks are designed to hold the items on the periphery of the mounting appliance, the heater is located inside the mounting appliance, and the perforated partition is mounted vertically between the heat-insulated body and the mounting appliance.

Recovery of tin-lead solder from electronic printed circuit board scrap using the conventional devices and methods has poor productivity, because the container capacity is not used to its fullest, and much of the processing cycle requires manual labor. Also, substrates of electronic printed circuit boards, which are made of CEM and FR, are good heat insulators and make it impossible to heat some areas of printed circuit boards evenly with thermal radiation only, since it may cause local areas of overheating to appear, which, in turn, leads to pyrolysis of organic substances.

SUMMARY OF THE INVENTION

The present invention is related to a method and system for recovery of tin-lead solder from electronic printed circuit board scrap, that substantially obviates one or more of the disadvantages of the related art.

The object is accomplished by means of the claimed method for recovering tin-lead solder from electronic printed circuit board scrap, characterized in that the scrap is placed in a liquid-permeable and/or gas-permeable container, which is placed in a liquid or gaseous heat-transfer medium heated to or above the melting temperature of the tin-lead solder, then, after the tin-lead solder is melted, the heat-transfer medium is removed from the container, then, by means of rotation of the container, the melted tin-lead solder and the remains of the heat-transfer medium are removed from the container, and also by means of the claimed device characterized in that it comprises a hollow container, which is designed in the form of a body of revolution and is mounted in such a way as to be capable of rotation, and is liquid-permeable and/or gas-permeable in a radial direction from the axis of rotation, wherein the container is designed in the form of a drum, which has perforated side walls so as to be permeable and can be vertically displaced.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
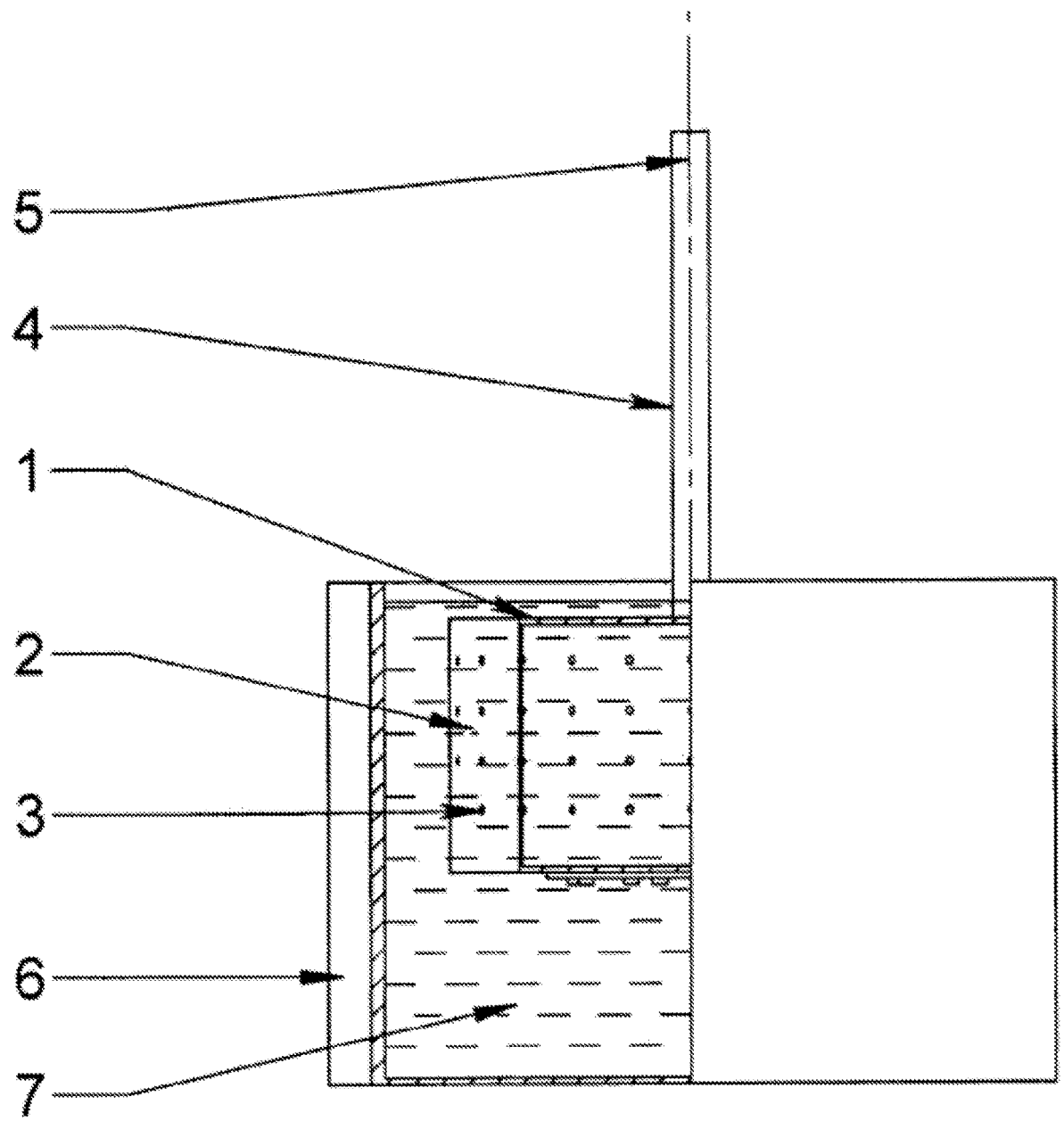
FIG. 1 shows a device for recovering tin-lead solder from electronic printed circuit board scrap containing a hollow container, which can be vertically displaced and is located inside the container for the heat-transfer medium.
Figure 2:
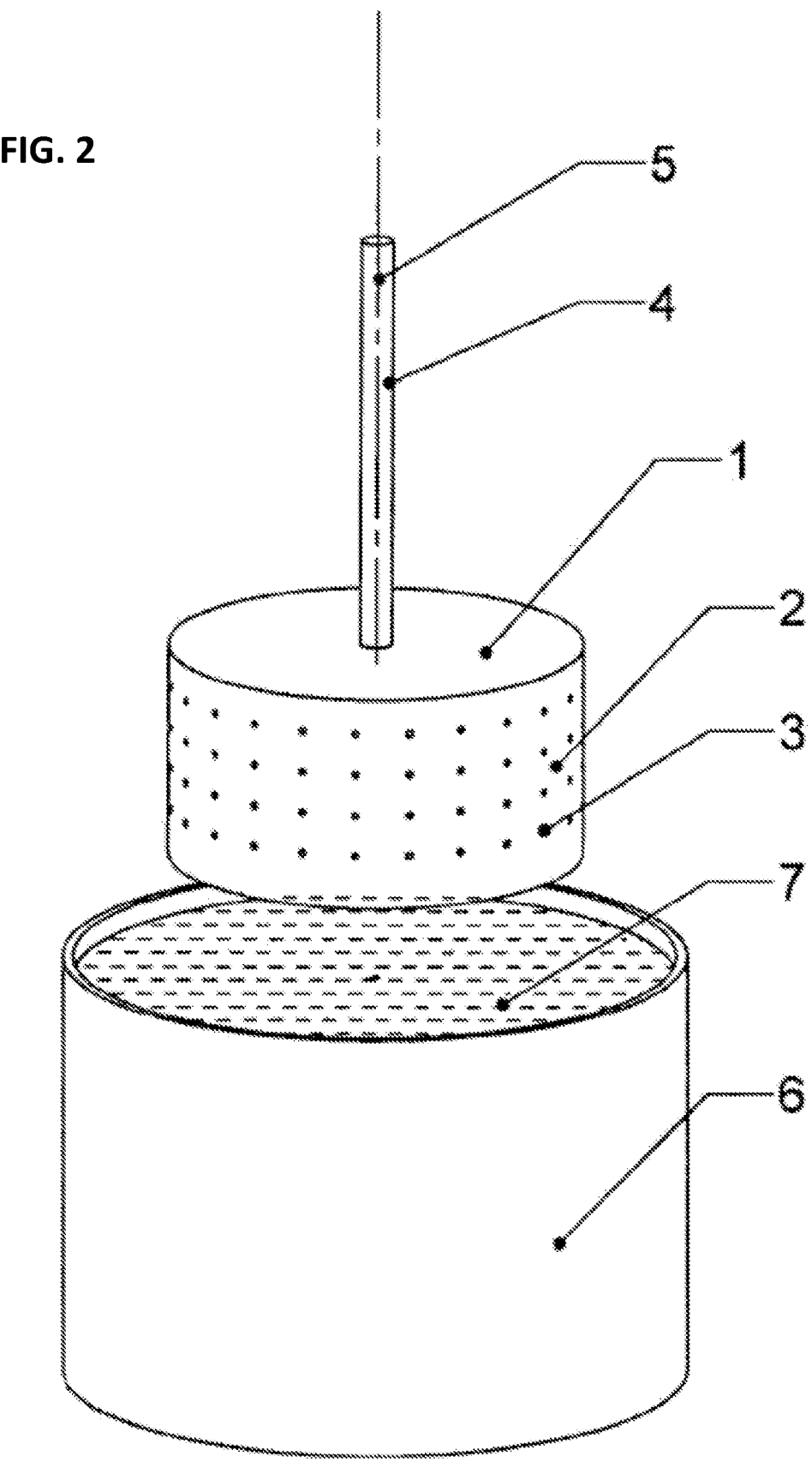
FIG. 2 shows the device for recovering tin-lead solder from electronic printed circuit board scrap containing a hollow container, which can be vertically displaced and is located outside the container.
Figure 3:
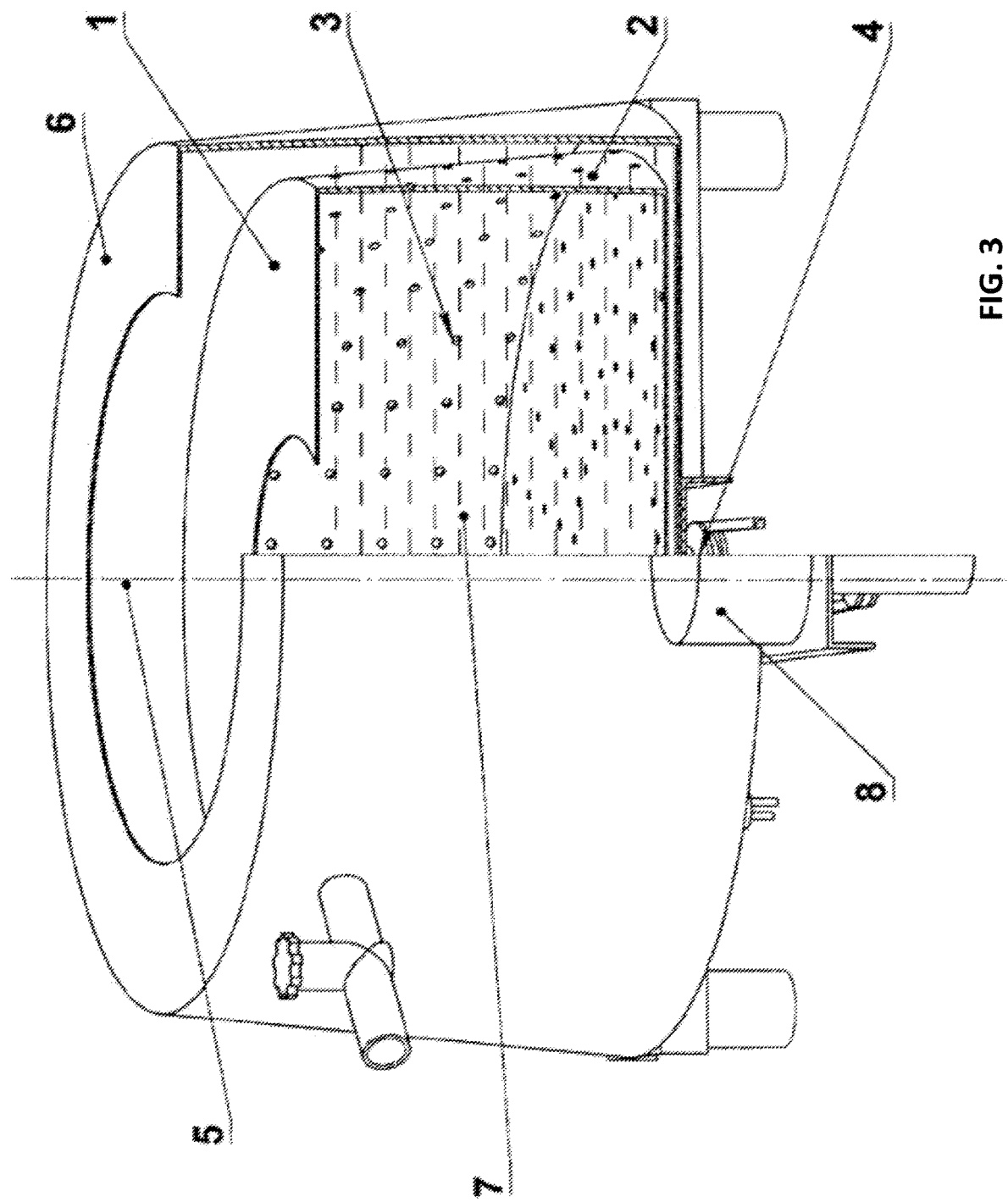
FIG. 3 shows the device for recovering tin-lead solder from electronic printed circuit board scrap containing a hollow container, which is located inside the container for the heat-transfer medium and cannot be vertically displaced.

FIG. 1 shows the device for recovering tin-lead solder from electronic printed circuit board scrap containing a hollow container, which can be vertically displaced and is located inside the container for the heat-transfer medium. FIG. 2 shows the device for recovering tin-lead solder from electronic printed circuit board scrap containing a hollow container, which can be vertically displaced and is located outside the container for the heat-transfer medium. FIG. 3 shows the device for recovering tin-lead solder from electronic printed circuit board scrap containing a hollow container, which is located inside the container for the heat-transfer medium and cannot be vertically displaced.

FIG. 1 has the following reference labels: 1—a hollow container, 2—permeable walls, 3—perforation, 4—a shaft, 5—the axis of rotation of the hollow container, 6—a container for the heat-transfer medium, 7—a heat-transfer medium, 8—motor.

The device for recovering tin-lead solder from electronic printed circuit board scrap is designed as follows.

The device for recovering tin-lead solder from electronic printed circuit board scrap contains a hollow container 1 designed from steel or stainless steel, in the form of a solid of revolution, with a diameter of about 270 mm (ranging from about 100 mm to about 3000 mm), a height of about 300 mm (ranging from about 100 mm to about 3000 mm), and a thickness of walls of about 1 mm (ranging from about 0.5 mm to about 10 mm). The hollow container 1 is mounted on a shaft 4 and is capable of rotating around the axis 5, at about 700 rpm (ranging from 60 to 2000 rpm). The container 1 rotates when driven by the motor 8. The walls 2 of the container 1 are liquid-permeable and/or gas-permeable in a radial direction from the axis of rotation 5. Optionally, the container 1 can be designed in the form of a drum. Optionally, the container 1 is made permeable by means of perforation 3 of its side walls 2, with the perforations being about 3 mm diameter (ranging from about 1 mm to about 30 mm). Optionally, the container 1 can be vertically displaced, in the range of 100 mm-3000 mm of vertical displacement, so as to be able to fully immerse the container in the medium and to be able to raise the container fully above it. The device also contains a container 6 for the heat-transfer medium, having a diameter of about 300 mm (ranging from 100 mm to 3000 mm). Optionally, the container 6 for the heat-transfer medium has an open top. The medium can be polyethylene glycol or similar.

The method for recovering tin-lead solder from electronic printed circuit board scrap is carried out as follows.

Electronic printed circuit board scrap is placed in the liquid-permeable and/or gas-permeable container 1. The container 1 containing the scrap is then placed in a liquid or gaseous heat-transfer medium 7 heated to or above the melting temperature of the tin-lead solder. The container 1 containing the scrap can be placed in the heat-transfer medium 7, for instance, by vertically submerging the container 1 into the heat-transfer medium 7, or by filling the container 1 containing the scrap, which is first placed in a heat-transfer medium-tight container, with the heat-transfer medium 7. The heat-transfer medium 7 can be heated either in advance or after the container 1 containing the scrap is placed in the medium. The tin-lead solder is melted in the heated heat-transfer medium 7, at a temperature of about 160° C.-300° C. Then, after the tin-lead solder is melted, the heat-transfer medium 7 is removed from the container 1 containing the scrap.

The heat-transfer medium 7 is removed from the container 1 containing the scrap, for example, by vertically withdrawing the container from the medium 7 or by pumping it away. After that, by means of rotation of the container 1 and the resulting centrifugal force, the melted tin-lead solder and the remains of the heat-transfer medium 7 are removed from the container.

The device for recovering tin-lead solder from electronic printed circuit board scrap operates as follows.

Electronic printed circuit board scrap is placed into the hollow container 1, which, after that, is placed in a liquid or gaseous heat-transfer medium 7, heated to or above the melting temperature of the tin-lead solder, bringing the scrap into contact with the heat-transfer medium 7 along the way. For example, the hollow container 1 can be put into the container 6 having an open top, which contains the heat-transfer medium 7, heated in advance above the melting temperature of the tin-lead solder. Otherwise, the scrap can be brought into contact with the heat-transfer medium 7 by pumping the medium into the container 1 containing the scrap, in which case the hollow container 1 is first placed in the heat-transfer medium-tight container 6, connected with feed and discharge lines for the heat-transfer medium 7.

The heat-transfer medium 7 can be heated either in advance or after the container 1 containing the scrap is placed in the medium, for example, by means of heating elements. The tin-lead solder is melted in the heated heat-transfer medium 7. Then, after the tin-lead solder is melted, the heat-transfer medium 7 is removed from the container 1 containing the scrap. The heat-transfer medium 7 is removed from the container 1 containing the scrap, for example, by vertically withdrawing the container 1 from the medium 7 or by pumping it away.

After that, by means of rotation of the container 1 and the resulting centrifugal force, the melted tin-lead solder and the remains of the heat-transfer medium 7 are removed from the container. The melt of the tin-lead solder is separated from the heat-transfer medium 7, for example, by means of decantation. By using a liquid or gaseous heat-transfer medium 7, it is possible to distribute the thermal energy evenly in the amount of electronic printed circuit board scrap. In the processing cycle of the claimed device, the scrap can fill the entire capacity of the hollow container 1. The electronic printed circuit board scrap to be processed may comprise either whole or crushed parts.

The technical result of the proposed technical solution is an increase in the productivity of the recovery of tin-lead solder from electronic printed circuit board scrap by means of the claimed method for recovering tin-lead solder from electronic printed circuit board scrap, characterized in that the scrap is placed in a liquid-permeable and/or gas-permeable container, which is placed in a liquid or gaseous heat-transfer medium heated to or above the melting temperature of the tin-lead solder, then, after the tin-lead solder is melted, the heat-transfer medium is removed from the container, then, by means of rotation of the container, the melted tin-lead solder and the remains of the heat-transfer medium are removed from the container, and also by means of the claimed device characterized in that it comprises a hollow container, which is designed in the form of a body of revolution and is mounted in such a way as to be capable of rotation, and is liquid-permeable and/or gas-permeable in a radial direction from the axis of rotation, wherein the container is designed in the form of a drum, which has perforated side walls so as to be permeable and can be vertically displaced.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A method for recovering tin-lead solder from electronic printed circuit board scrap, the method comprising:
   placing the scrap in a liquid-permeable and/or gas-permeable container that is mounted on a vertical shaft and is rotatable about the vertical shaft without vibration, wherein the container is placed in a liquid or gaseous heat-transfer medium heated to or above the melting temperature of the tin-lead solder, and
   after the tin-lead solder is melted, removing the heat-transfer medium from the container, and rotating the container to remove the melted tin-lead solder and remains of the heat-transfer medium.

2. A device for recovering tin-lead solder from electronic printed circuit board scrap, the device comprising:

a hollow container having a form of a solid of revolution, wherein the hollow container is mounted on a vertical shaft so as to be rotatable about a vertical axis of rotation without vibration and is liquid-permeable and/or gas-permeable in a radial direction from the axis of rotation of the hollow container, and wherein the hollow container is vertically displaceable along the vertical axis of rotation prior to rotation so that a heat transfer medium drains from it.

3. The device of claim 2, wherein the hollow container is in a form of a drum.

4. The device of claim 2, wherein the hollow container includes perforated side walls.

5. A device for recovering tin-lead solder, the device comprising:

a hollow container having a form of a solid of revolution, wherein the hollow container is mounted on a vertical shaft and is rotatable about a vertical axis of rotation without vibration and is liquid-permeable and/or gas-permeable in a radial direction from the axis of rotation, and wherein the hollow container is vertically displaceable along the vertical axis of rotation prior to rotation so as to drain a heat transfer medium from it.

* * * * *